Jan. 31, 1939.  E. W. McCARTNEY  2,145,771
TRANSPLANTER
Filed April 28, 1937  4 Sheets-Sheet 1
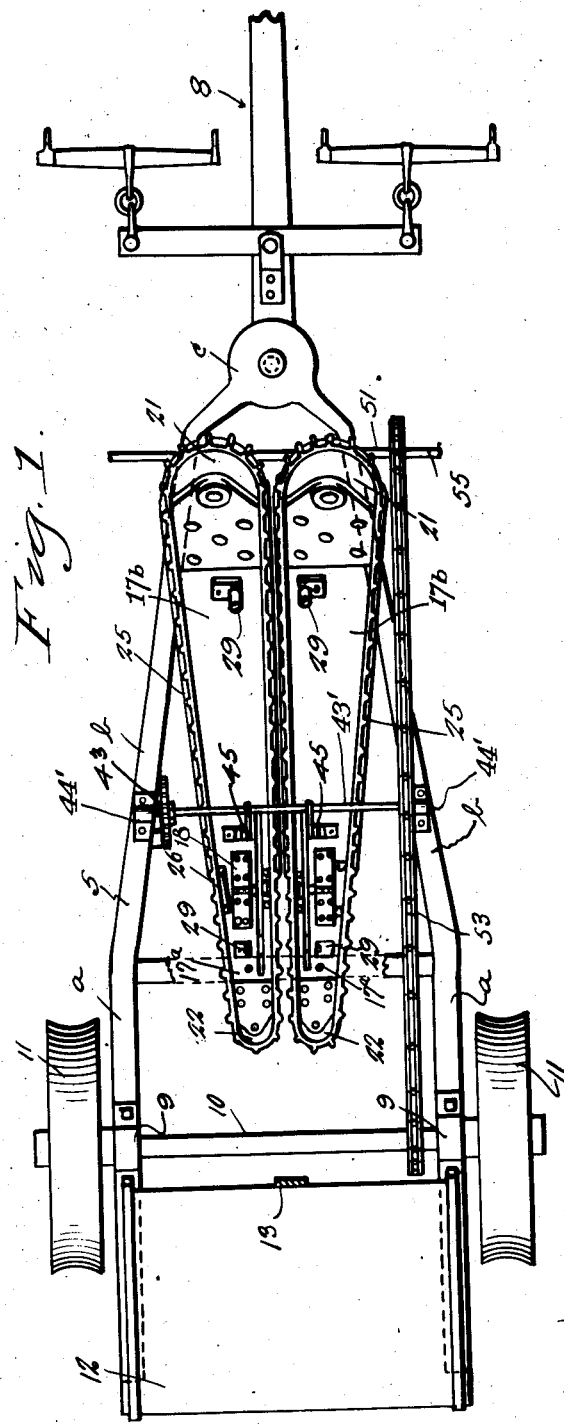
Inventor
E. W. McCartney
By Clarence A. O'Brien
Hyman Berman
Attorneys Jan. 31, 1939.  E. W. McCARTNEY  2,145,771
TRANSPLANTER
Filed April 28, 1937  4 Sheets-Sheet 2
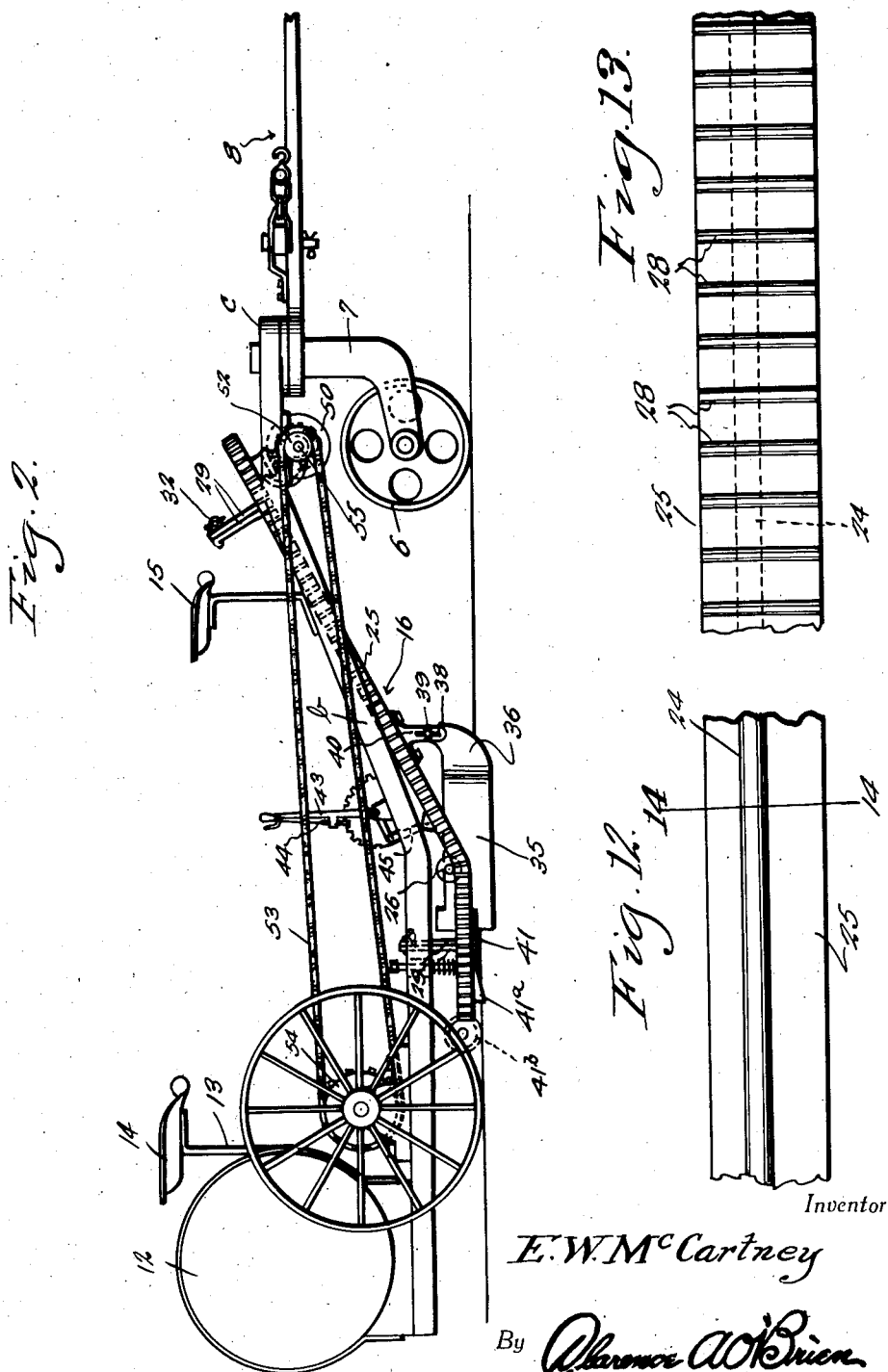
Inventor
E. W. McCartney
By Clarence A. O'Brien
Hyman Berman
Attorneys Jan. 31, 1939.  E. W. McCARTNEY  2,145,771
TRANSPLANTER
Filed April 28, 1937  4 Sheets-Sheet 3
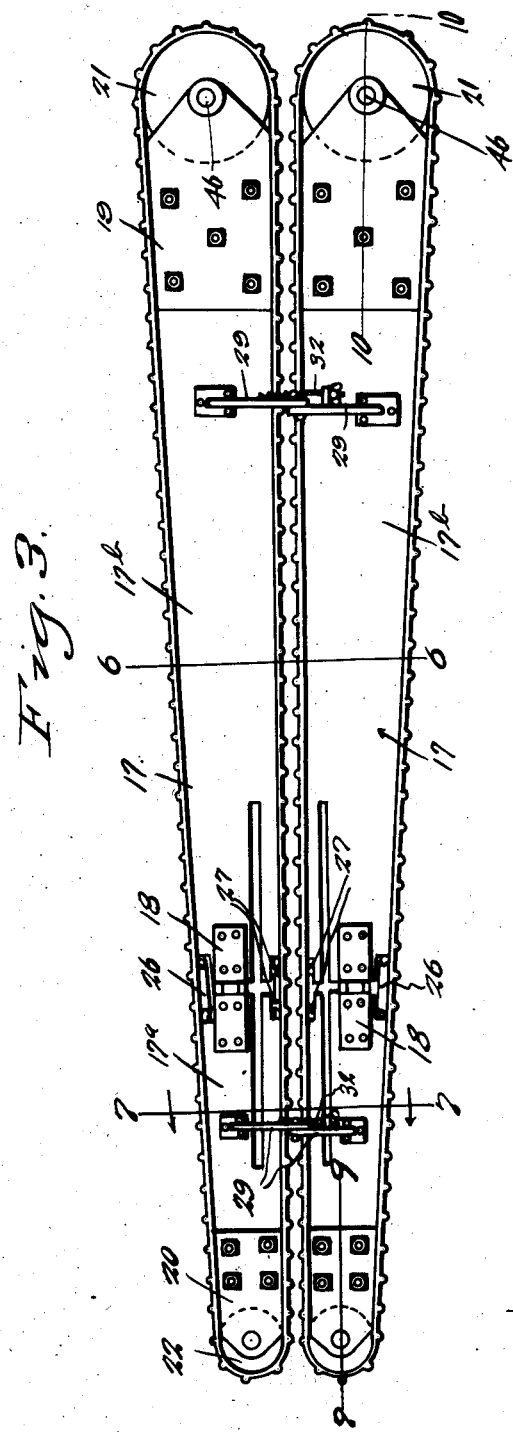
Inventor
E. W. McCartney
By Clarence A. O'Brien
Hyman Berman
Attorneys Jan. 31, 1939.  E. W. McCARTNEY  2,145,771
TRANSPLANTER
Filed April 28, 1937    4 Sheets-Sheet 4
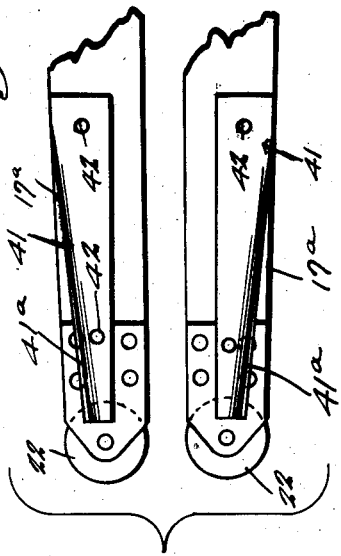
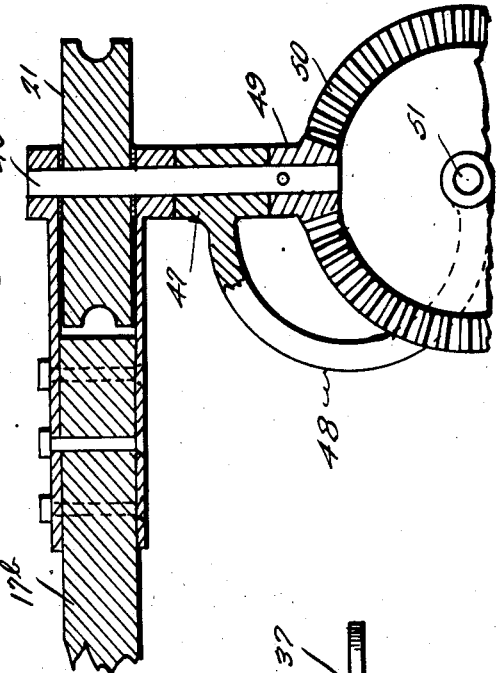
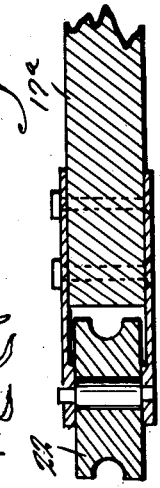
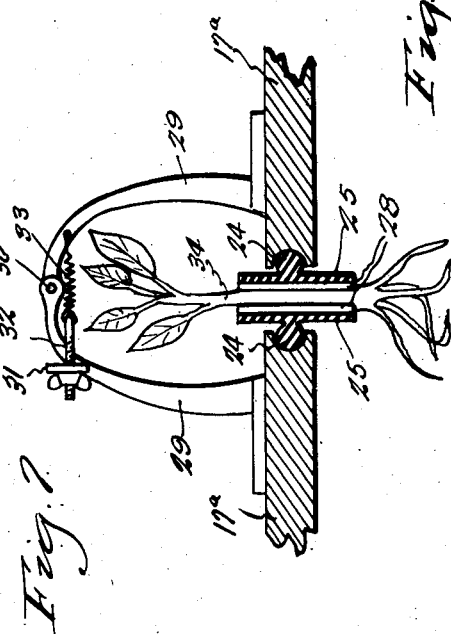
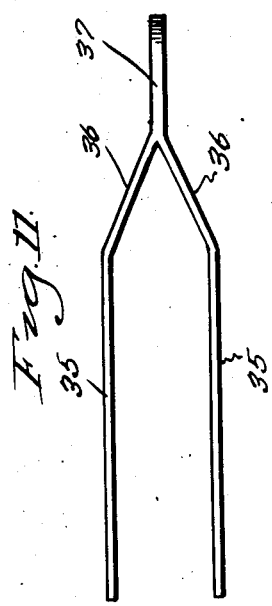
Inventor
E. W. McCartney
By Clarence A. O'Brien
Hyman Berman
Attorneys Patented Jan. 31, 1939

2,145,771

UNITED STATES PATENT OFFICE 2,145,771

TRANSPLANTER

Edward W. McCartney, Joplin, Mo., assignor of one-half to Allen Pfost, Drexel, Mo., and one-eighth to Byron McCartney, Houston, Tex.

Application April 28, 1937, Serial No. 139,617

3 Claims. (Cl. 111—3)

This invention appertains to new and useful improvements in agricultural implements and more particularly to a transplanter.

The principal object of the present invention is to provide a transplanting machine capable of planting much more rapidly than the present day types of machines now in general use.

Another important object of the invention is to provide a transplanting machine wherein the plant handler sits in advance of the packer, to the end that the plants are fed from a forward corner of the machine, consequently reducing the likelihood of jamming of the machine and confusion on the part of the plant handler.

Still another important object of the invention is to provide a transplanter wherein the plants of various size can be accommodated.

Other important objects and advantages of the invention will become apparent to the reader of the following specification.

In the drawings:—

Figure 1 represents a top plan view of the machine.

Figure 2 represents a side elevational view of the machine.

Figure 3 is a top plan view of the conveyor assembly.

Figure 4 is a fragmentary side elevational view of the conveyor belt carrier at the hinged portion thereof.

Figure 5 is a fragmentary side elevational view showing the inner side of the joint shown in Figure 4.

Figure 6 is a cross sectional view on the line 6—6 of Figure 3.

Figure 7 is a cross sectional view taken substantially on the line 7—7 of Figure 3, showing a plant being transported.

Figure 8 is a bottom plan view of the rear end of the conveyors assembly.

Figure 9 is a fragmentary detailed sectional view taken substantially on the line 9—9 of Figure 3.

Figure 10 is a fragmentary detailed sectional view taken substantially on the line 10—10 of Figure 3.

Figure 11 is a top plan view of the plow or shoe.

Figure 12 is a fragmentary inside elevational view of the belt.

Figure 13 is a fragmentary elevational view of the outside of the belt.

Figure 14 is a section on the line 14—14 of Figure 12.

Referring to the drawings wherein like numerals designate like parts, it can be seen that the machine consists of a frame 5 (see Figure 1) consisting of the side bars $a$—$a$ and the inclined forwardly converging portions $b$—$b$, the same being connected together at the frame head $c$. A caster wheel 6 has the shaft of its mount 7 journaled through this head $c$. Numeral 8 represents suitable draft means attached to the forward end of the frame.

The frame members $a$—$a$ have bearings 9 thereon through which the rear axle 10 is journaled, this axle being provided with the wheels 11 at the ends thereof. Numeral 12 represents a water tank mounted on the rear ends of the said frame members $a$—$a$.

A spring 13 extends upwardly from the forward side of the tank and supports the seat 14. A second seat, preferably for the plant handler is denoted by numeral 15 and is supported by the portions $b$—$b$ of the frame.

Numeral 16 denotes the conveying means of the transplanter and this consists of the pair of rearwardly tapering boards or plates 17—17. These boards 17—17 are divided into sections 17a—17b hingedly connected together as at 18.

Bearing plates 19—20 project from the forward and rearward ends of the boards 17 and have pulleys 21—22 mounted between the same, the pulleys being grooved and the grooves of these pulleys are aligned with the longitudinally extending grooves 23 in the edge portions of the sections 17a—17b for accommodating a longitudinally extending rib 24 of the corresponding plant conveying belt 25 which is of the endless type.

At the hinged connection 18 of each of the boards 17 is located a grooved pulley 26 at the outer edge of the board to engage the rib 24 of the belt 25, while at the inner edge of the board and at the hinged joint are located the smaller grooved rollers 27—27 for engaging the rib 24 of the belt and guiding the same over the said joint.

As is apparent in Figures 3 and 13, the belts at their outer sides are provided with transversely extending ribs 28. The ribs of the companion belts come together to form pockets for the reception of the plants to be set.

To tensionally hold the conveyor belts together against the plants being transported toward the ground, a pair of arms 29—29 is provided on the forward end portion of the conveying means and a second pair of like arms on the rear portion. In other words, there is a pair of these arms 29—29 connecting the sections 17b—17b and a second pair connecting the sections 17a—17a. These arms 29—29 curve inwardly and are pivotally connected together at their upper ends as at 30. One of the arms 29 of each pair is provided with a lug 31 through which the screw 32 is feedable and a spring 33 connects this screw with the other arm. Thus adjustable tensioning means is afforded between the arms for regulating the tension between the board sections 17a—17a or 17b—17b. In Figure 7 a plant 34 is shown gripped between the belts 25—25.

Figure 11 shows a shoe or plow for preparing a furrow in the ground and this consists of a pair of blade members 35—35 converging together as at 36 and merging with the single ground opening blade 37 which extends upwardly as at 38 (see Figure 2) and has a bolt and slot connection 39 to the bracket 40.

Numeral 41 represents the packer for drawing in the earth around the settings. The packer 41 is made up of the blades 41a—41a the forward ends of which are flared outwardly in the nature of a twist secured by suitable means 42 to the underside of the board sections 17a—17a.

A hand bar 43 provided with a detent 44 rocks a shaft 43' which has a link connection 45 with the lower portion of the conveyors assembly whereby the same can be adjusted with respect to the ground. The ends of rock shaft 43' are journaled in brackets 44'.

As is shown in Figure 10, each of the forward pulleys 21 is located on the shaft 46 which extends downwardly through the bearing 47 of the arm 48 and at its lower end is equipped with a beveled pinion 49 which meshes with the beveled gear 50 on the shaft 51 extending through the arm 48. This shaft 51 is equipped with a pulley 52 driven by a belt 53 from the pulley 54 on the axle 10.

Numeral 55 represents an extension of the shaft 51 to accommodate a check row attachment when such is desired.

It can also be seen that roller packers 41b are mounted rearwardly of the drag packer 41. The drag packer forces the soil to the plants to hold the plants and in erect position until the roller packer packs the same.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. In a transplanter, an inclined conveyor along which settings are moved downwardly, a horizontal extension at the lower end of the conveyor, a plow depending from the lower portion of the inclined conveyor, and a ground engaging member mounted on the horizontal extension, said inclined conveyor having the said extension hingedly connected thereto.

2. In a transplanting machine, a pair of inclined coacting conveyors each provided with a horizontally disposed and hingedly connected lower section, said hinged lower section provided with a ground engaging member.

3. In a transplanter, a wheel supported frame, a pair of belt supporting members carried by the frame and each including a downwardly and rearwardly inclined part and a rearwardly extending horizontal part, means for hinging the horizontal part to the inclined part, belts passing around the edges of the supporting members, brackets extending upwardly from said inclined and horizontal parts of the members and having their upper ends hingedly connected together, a spring connecting each bracket on one member to a bracket on the other member and means for adjusting the horizontal part of each member toward and away from the ground.

EDWARD W. McCARTNEY.